United States Patent
Adolphs

(10) Patent No.: US 8,007,893 B2
(45) Date of Patent: Aug. 30, 2011

(54) REINFORCEMENT STRUCTURES AND PROCESSES FOR MANUFACTURING SAME

(75) Inventor: Georg Adolphs, Sabadell (ES)

(73) Assignee: OCV Intellectual Capital, LLC, Toledo, OH (US)

( * ) Notice: Subject to any disclaimer, the term of this patent is extended or adjusted under 35 U.S.C. 154(b) by 0 days.

(21) Appl. No.: 10/404,199

(22) Filed: Mar. 31, 2003

(65) Prior Publication Data

US 2004/0191472 A1   Sep. 30, 2004

(51) Int. Cl.
*B32B 5/12* (2006.01)
(52) U.S. Cl. ............ 428/113; 428/54; 428/55; 428/102; 428/293.4; 428/304.4; 442/370; 442/374
(58) Field of Classification Search .................. 428/113, 428/54, 55, 102, 293.4, 304.4; 442/370, 442/374, 375, 370.75, 374.3
See application file for complete search history.

(56) References Cited

U.S. PATENT DOCUMENTS

| | | | |
|---|---|---|---|
| 3,044,146 A * | 7/1962 | Thomas | 428/102 |
| 3,652,376 A * | 3/1972 | Bowden, III | 442/104 |
| 3,842,832 A | 10/1974 | Wideman et al. | |
| 4,013,810 A * | 3/1977 | Long | 428/313.9 |
| 4,110,508 A * | 8/1978 | Isgur et al. | 442/227 |
| 4,250,136 A * | 2/1981 | Rex | 264/257 |
| 4,346,133 A | 8/1982 | Hipchen et al. | |
| 4,446,189 A | 5/1984 | Romanek | |
| 4,828,910 A | 5/1989 | Haussling | |
| 4,911,973 A | 3/1990 | Dunbar | |
| 5,007,976 A | 4/1991 | Satterfield et al. | |
| 5,047,276 A | 9/1991 | Chomarat et al. | |
| 5,049,439 A * | 9/1991 | Robinson | 442/225 |
| 5,112,678 A | 5/1992 | Gay et al. | |
| 5,251,414 A * | 10/1993 | Duke | 52/309.16 |
| 5,352,216 A | 10/1994 | Shiono et al. | |
| 5,698,302 A | 12/1997 | Brandon et al. | |
| 5,872,067 A * | 2/1999 | Meng et al. | 442/387 |
| 5,888,329 A | 3/1999 | Cho et al. | |
| 6,093,481 A | 7/2000 | Lynn et al. | |
| 6,211,102 B1 | 4/2001 | Jones et al. | |
| 6,365,533 B1 | 4/2002 | Horner, Jr. et al. | |
| 6,368,991 B1 | 4/2002 | Horner, Jr. et al. | |

FOREIGN PATENT DOCUMENTS

| | | |
|---|---|---|
| EP | 0283195 | 9/1988 |
| EP | 395548 | 9/1989 |
| EP | 0534041 | 12/1991 |
| EP | 659922 | 6/1995 |
| EP | 694543 | 4/1998 |
| EP | 1010793 | 6/2000 |
| FR | 2562471 | 10/1985 |

(Continued)

OTHER PUBLICATIONS

Communication from European Application No. 04724296.1 dated Aug. 7, 2006.

(Continued)

*Primary Examiner* — Jane Rhee
(74) *Attorney, Agent, or Firm* — Calfee, Halter & Griswold LLP

(57) ABSTRACT

Reinforcement structures and processes for forming same are provided, wherein the reinforcement structures are adapted for use in forming composite parts. The structures comprise a first reinforcement layer; a second reinforcement layer; and a flexible core layer comprising elongated fibers and a plurality of discrete bodies.

24 Claims, 3 Drawing Sheets

FOREIGN PATENT DOCUMENTS

| | | |
|---|---|---|
| FR | 2602178 | 2/1988 |
| GB | 1496044 | 12/1977 |
| JP | 39281 | 3/1987 |
| JP | 246686 | 9/2001 |
| WO | 96/13627 | 5/1996 |
| WO | 2004/87410 | 10/2004 |

OTHER PUBLICATIONS

Response to Communication from European Application No. 04724296.1 dated Dec. 15, 2006.

Communication from European Application No. 04724296.1 dated Aug. 17, 2009.

Response to Communication from European Application No. 04724296.1 dated Feb. 25, 2010.

International Search Report and Written Opinion from PCT/EP04/03653 dated Jul. 21, 2004.

Office action from Canadian Application No. 2,520,588 dated Oct. 14, 2010.

\* cited by examiner

REINFORCEMENT STRUCTURES AND PROCESSES FOR MANUFACTURING SAME

TECHNICAL FIELD AND INDUSTRIAL APPLICABILITY OF THE INVENTION

The present invention relates to reinforcement structures adapted for use in a composite part forming operation, such as resin transfer molding or vacuum infusion processing, and processes for forming the reinforcement structures.

BACKGROUND OF THE INVENTION

Resin transfer molding is a closed molding operation for forming reinforced composite parts, such as chairs, automobile parts, aircraft components and surfboard fins. It involves placing a reinforcement structure within a mold cavity, wherein the mold cavity has a shape of the desired composite part. The mold is then closed and a matrix resin is injected into the mold under pressure such that the resin material substantially completely impregnates the reinforcement structure. After resin impregnation has been effected, the resin is cured, such as by heating the mold. Thereafter, the resultant composite part is removed from the mold.

One known reinforcement structure for use in forming reinforced composite parts comprises first and second outer layers of reinforcement fibers, such as discrete glass fibers. Located between the outer layers is a flexible core layer comprising elongated fibers, such as synthetic fibers. During a resin transfer molding operation, the core layer is substantially impregnated with resin material. Once cured, the resin material is typically dense, has poor to average shear strength during bending or flexure and has a poor to average elastic modulus. Consequently, due to the high content of matrix resin material in the core layer, composite parts formed with this reinforcement structure typically have a center or core section which is substantially high in weight, a shear strength during bending or flexure similar to that of the matrix resin, and an elastic modulus similar to that of the matrix resin. It is also noted that resin shrinkage increases as the matrix resin content in a composite part increases.

It would be desirable to have a reinforcement structure comprising first and second outer layers of reinforcement fibers and a flexible core layer, and wherein, after matrix resin impregnation of the reinforcement structure, a composite part results having a core section which is light weight, and has improved mechanical properties over those of a core section of a composite part having incorporated therein the prior art reinforcement structure noted above.

BRIEF SUMMARY OF THE INVENTION

In accordance with a first aspect of the present invention, a reinforcement structure adapted for use in forming a composite part is provided. The structure comprises a first reinforcement layer; a second reinforcement layer; and a flexible core layer comprising elongated fibers and a plurality of discrete bodies.

Preferably, at least one of the first and second reinforcement layers is formed from a plurality of discrete fibers. The discrete fibers may comprise fibers selected from the group consisting of ceramic fibers, glass fibers, carbon fibers, graphite fibers, polymer fibers, and combinations thereof. The core layer is preferably positioned between the first and second reinforcement layers.

Further provided is structure for coupling the first, second and core layers together. The coupling structure preferably comprises stitching passing through each of the first, second and core layers.

The elongated fibers defining the core layer are preferably mechanically coupled together so as to define one or more flexible, porous, non-woven layers. The discrete bodies are associated with the one or more non-woven layers. In accordance with a first embodiment of the present invention, the elongated fibers defining the core layer are mechanically coupled together so as to define a single flexible, non-woven layer. In accordance with a second embodiment of the present invention, the elongated fibers defining the core layer are mechanically coupled together so as to define first and second flexible, non-woven layers. The non-woven layers may comprise fibers selected from the group consisting of polyester fibers, polyethylene terephthalate (PET) fibers, polypropylene fibers, polyethylene fibers, polyamide fibers, polyacrylonitrile fibers (PAN), glass fibers, and combinations thereof. The fibers of the non-woven layers of the first and second embodiments may be wave-like in shape or define undulations.

The discrete bodies may be formed from a material selected from the group consisting of expanded polystyrene, polyvinyl chloride foam, polyvinyl chloride-urea foam, and polyurethane foam. It is also contemplated that the discrete bodies may be formed from hollow glass spheres and one of expanded polystyrene, polyvinyl chloride foam, polyvinyl chloride-urea foam and polyurethane foam. Preferably, the discrete bodies have a density which is less than that of a matrix resin to be impregnated into the reinforcement structure. It is also preferred that the discrete bodies do not comprise microspheres including a blowing agent.

The core layer is preferably substantially devoid of a resin binder material.

In accordance with a second aspect of the present invention, a process is provided for forming a reinforcement structure comprising the steps of: providing first reinforcement material for defining a first reinforcement layer; providing a flexible core layer comprising elongated fibers; providing discrete bodies and associating the discrete bodies with the flexible core layer; and, providing second reinforcement material for defining a second reinforcement layer.

The step of providing first reinforcement material may comprise the step of providing fibers selected from the group consisting of ceramic fibers, glass fibers, carbon fibers, graphite fibers, polymer fibers, and combinations thereof. The step of providing a flexible core layer comprising elongated fibers may comprise the step of providing a flexible, non-woven layer of mechanically coupled elongated fibers.

It is also contemplated that a reinforcement structure constructed in accordance with the present invention may comprise layers in the following order: a first reinforcement layer; a first flexible core layer comprising elongated fibers and a plurality of discrete bodies; a second reinforcement layer; a second flexible core layer comprising elongated fibers and a plurality of discrete bodies; and a third reinforcement layer. It is further contemplated that a reinforcement structure constructed in accordance with the present invention may comprise more than three reinforcement layers and more than two flexible core layers, wherein each flexible core layer comprises elongated fibers and a plurality of discrete bodies. It is still further contemplated that a reinforcement structure constructed in accordance with the present invention may comprise three or more reinforcement layers and two or more flexible core layers, wherein at least one of the flexible core layers is devoid of discrete bodies and one of the flexible core layer includes discrete bodies.

DETAILED DESCRIPTION OF THE INVENTION

Figure 1:
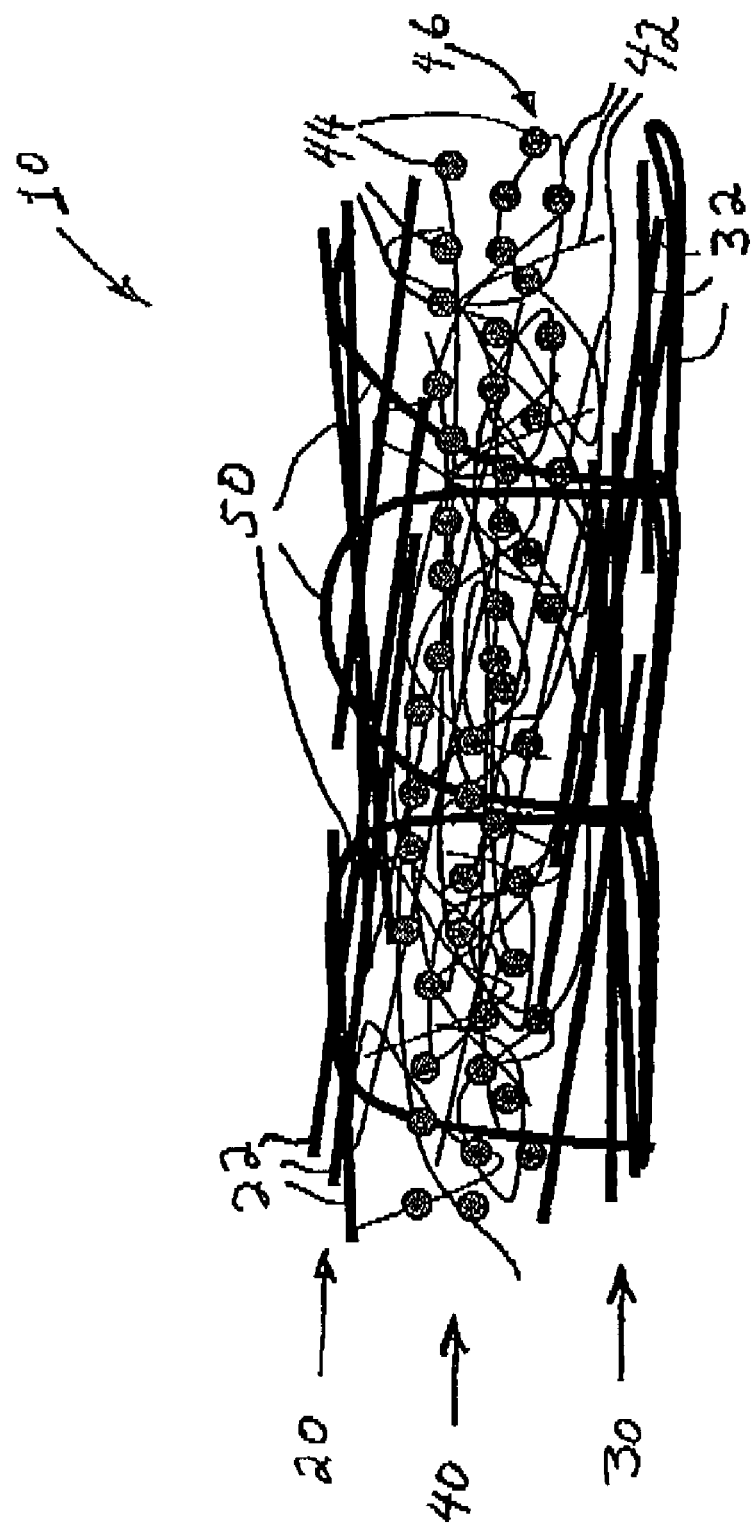
FIG. 1 is a side view of a reinforcement structure constructed in accordance with a first embodiment of the present invention.

Reference is now made to FIG. 1, which illustrates a reinforcement structure 10 constructed in accordance with a first embodiment of the present invention. The structure 10 is adapted to be used in a composite part forming operation, such as a resin transfer molding operation or a vacuum infusion processing operation. As noted above, resin transfer molding involves placing a reinforcement structure within a mold cavity (not shown), wherein the mold cavity has a shape of the desired final composite part. The mold is then closed and a matrix resin is injected into the mold under pressure such that the resin material substantially completely impregnates the reinforcement structure. After resin impregnation has been effected, the resin is cured, which curing process may be accelerated by heating the mold. Thereafter, the resultant composite part is removed from the mold. Vacuum infusion processing involves placing the reinforcement structure 10 in an open mold, covering the structure 10 and adjacent portions of the mold with a sheet of plastic and sealing the plastic sheet to the mold. A vacuum is then pulled in the space between the open mold and the plastic sheet such that a matrix resin is pulled into the space and impregnated into the reinforcement structure 10. A number of resin matrix materials, typically made reactive with a hardener, may be used during the composite part forming operation including the following thermoset resins: polyesters, epoxies, phenolics, acrylics, and vinyl esters.

The reinforcement structure 10 comprises a first reinforcement layer 20, a second reinforcement layer 30 and a flexible core layer 40 comprising elongated fibers 42 and a plurality of lightweight discrete bodies 44. The core layer 40 is positioned between the first and second reinforcement layers 20 and 30. The first, second and core layers 20, 30 and 40 are coupled together via stitching 50, i.e., thread. The stitching operation may be effected via a conventional knitting operation.

The first and second reinforcement layers 20 and 30 are preferably formed from randomly oriented discrete fibers 22 and 32. The fibers 22 and 32 preferably have a length of from about 0.5 inch to about 2 inches and a diameter of from about 2 microns to about 40 microns. The discrete fibers may be selected from the group consisting of ceramic fibers, glass fibers, carbon fibers, graphite fibers, polymer fibers, and combinations thereof. The discrete glass fibers include those formed from the following glass types: E, C, R, A and S. Example discrete glass fibers include those that are cut or chopped from continuous glass fibers commercially available from Owens Corning under the trade designation ADVANTEX™ MULTI-END ROVING or T30™ DIRECT ROVING. Example discrete polymeric fibers include those which are cut or chopped from continuous aramid fibers, which fibers are commercially available from E.I. du Pont de Nemours and Company under the trade designation KEVLAR® or from Teijin Twaron BV under the trade designation TWARON®. The first reinforcement layer 20 preferably comprises, prior to matrix resin impregnation, of from about 25% to about 47.5% by weight, based on the total weight of the reinforcement structure 10. The second reinforcement layer 30 preferably comprises, prior to matrix resin impregnation, of from about 25% to about 47.5% by weight, based on the total weight of the reinforcement structure 10. Each of the first and second reinforcement layers 20 and 30 is preferably substantially completely devoid of a resin binder material.

It is also contemplated that the first and/or second reinforcement layers 20 and 30 may be formed from woven or knitted continuous fiber material. Examples of such material include those which are commercially available from Owens Corning under the trade designation KNYTEX Fabrics WR24-5x4 or KNYTEX Fabrics CD240C.

As noted above, the flexible core layer 40 comprises elongated fibers 42 and a plurality of discrete bodies 44. The elongated fibers 42 are randomly oriented and mechanically bonded, i.e., interlocked, typically without the use of a binder material, together so as to define a substantially planar, flexible, porous non-woven layer 46. The non-woven layer 46 may comprise any fabric that is flexible, porous and non-woven. Preferably, the non-woven layer 46 is formed from elongated fibers selected from the group consisting of polyester fibers, polyethylene terephthalate (PET) fibers, polypropylene fibers, polyethylene fibers, polyamide fibers, polyacrylonitrile (PAN) fibers, glass fibers, and combinations thereof. The elongated fibers 42 may have a length of from about 10 mm to about 120 mm and a diameter of from about 5 dtex to about 100 dtex. Prior to being combined with the first and second reinforcement layers 20 and 30 and including the discrete bodies 44 impregnated or placed therein, the non-woven layer 46 preferably has a thickness in the Z direction, see FIG. 1, of from about 2 mm to about 12 mm and an area weight of from about 70 g/m$^2$ to about 900 g/m$^2$.

Figure 3:
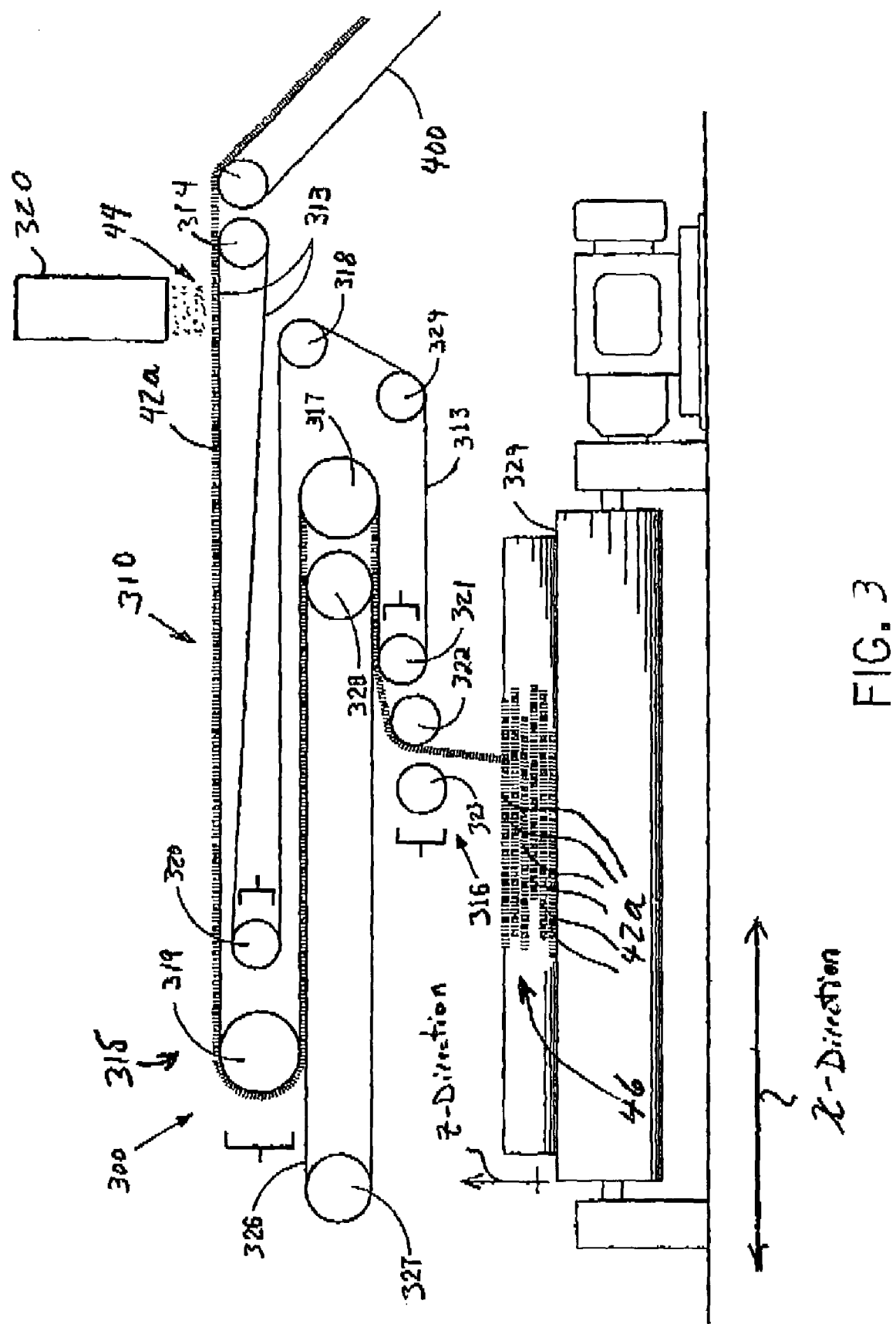
FIG. 3 is a view of a cross-lapper/dispensing apparatus for forming a flexible core layer.

The flexible core layer 40 may be formed using a cross-lapper/dispensing apparatus 300, see FIG. 3. The elongated fibers 42, discussed above, are formed into a thin fiber web 42a via a conventional carding machine (not shown). The web 42a may have a thickness of from about 0.1 mm to about 2 mm. The web 42a is fed from the carding machine to the cross-lapper/dispensing apparatus 300 via a conveyor 400. The cross-lapper/dispensing apparatus 300 comprises a conventional cross-lapper 310, such as the one disclosed in U.S. Pat. No. 4,984,772, the disclosure of which is hereby incorporated by reference, in combination with a conventional powder dispensing device 320.

The discrete bodies 44 are impregnated into the web 42a via the dispensing device 320. "Impregnating," as used herein, refers to a process for integrating discrete bodies 44 into the non-woven layer 46. The process of impregnating may be conducted by any process suitable for placing, integrating or incorporating the discrete bodies 44 into the non-woven layer 46. In the embodiment illustrated in FIG. 3, the discrete bodies 44 are dispensed from the dispensing device 320 at a rate of from about 20 grams/m$^2$ to about 300 grams/m$^2$ and fall via gravity onto the web 42a.

Referring now to FIG. 3, the cross-lapper 310 comprises an endless transporting belt 313, threaded among fixed and movable rollers as will be described. Rollers 314 are fixed. The transporting belt 313 is passed around reciprocating belt carriage means 315 and 316; and, between those reciprocating belt carriage means 315, 316, the transporting belt 313 is passed around a pair of fixed rollers 317 and 318. Reciprocating belt carriage means 315 includes roller 319 which carries the web 42a in a reciprocating manner at the upper end of the crosslapper 310 and roller 320 which serves as a loop control for the upper end of the transporting belt 313. Reciprocating belt carriage means 316 includes roller 321 which carries the web 42a in a reciprocating manner at the lower end of the crosslapper 310 and delivers the web 42a through delivery means made up of rollers 322 and 323 to a moving conveyor 329. Roller 324 serves as an idler roll for the purpose of maintaining a proper tension on the belt system.

The web 42a is moved from transporting belt 313 to transporting belt 326 which is continuously run on fixed rollers 327 and 328. Transporting belts 313 and 326 sandwich the web 42a to hold it in place until such time that it is moved into the reciprocating carriage means 316 and through the delivery means 322 and 323. The web 42a passes through the reciprocating delivery means 322 and 323 and is laid on the conveyor 329 continuously in a rectilinear path substantially perpendicular to the path of the reciprocating carriage means 316.

The reciprocating carriage means 316 causes the web 42a to be lapped or layered on the conveyor 329 as the carriage means 316 reciprocates back and forth in the X-direction, see FIG. 3, so as to form a single, substantially planar, flexible, porous non-woven layer 46 including discrete bodies 44 impregnated therein. The non-woven layer 46 impregnated with discrete bodies 44 defines the flexible core layer 40 in the FIG. 1 embodiment. Preferably, the non-woven layer 46 comprises a plurality of layers of the web 42a, e.g., 10 layers, such that the non-woven layer 46 has a thickness in the Z-direction of from about 2 mm to about 15 mm.

It is also contemplated that the plurality of web layers 42a may be needle punched using a conventional needling punching apparatus (not shown) once they have exited the conveyor 329 so as to mechanically join the layers defining the non-woven layer 46.

In accordance with a first aspect of the present invention, the lightweight discrete bodies 44 may be formed substantially entirely from a material selected from the group consisting of expanded polystyrene, polyvinyl chloride foam, polyvinyl chloride-urea foam and polyurethane foam. The foam material may comprise a closed-cell foam; and, preferably, the foamed or expanded discrete bodies 44 of the first aspect of the present invention have a length of from about 0.1 mm to about 3 mm, a diameter of from about 0.5 mm to about 1 mm, and density of from about 0.02 grams/cm$^3$ to about 0.5 grams/cm$^3$. Example discrete bodies 44 of the first aspect of the present invention may be formed, for example, from a material commercially available from DIAB International AB under the product designation "Divinycell Foam Material," which product is ground to a desired particle size.

In accordance with a second aspect of the present invention, the discrete bodies 44 may comprise expanded polystyrene, foamed polyvinyl chloride, polyvinyl chloride-urea foam or polyurethane foam main bodies having hollow glass spheres incorporated therein. The hollow glass spheres have a diameter of from about 0.1 mm to about 0.3 mm. Each discrete body 44 includes approximately 5-20 glass spheres incorporated therein. The glass sphere/polymeric material discrete bodies 44 have a length of from about 0.1 mm to about 5 mm, a diameter of from about 0.1 mm to about 3.0 mm, and density of from about 0.05 grams/cm$^3$ to about 0.9 grams/cm$^3$. Example glass spheres includes those that are commercially available from 3M under the product designation "Scotchlite Glass Bubbles." It is contemplated that the discrete bodies 44 may be formed by grinding an expanded or foam material, such as one of the materials noted above, containing the glass spheres into particles or discrete bodies of a desired size.

The density of the discrete bodies 44, including those formed substantially from only expanded polystyrene, polyvinyl chloride foam, polyvinyl chloride-urea foam or polyurethane foam as well as those formed having hollow glass spheres, is preferably substantially less than that of the matrix resin to be impregnated into the reinforcement structure 10. With regard to the discrete bodies 44 including hollow glass spheres, it is believed that the elastic modulus and a shear modulus for those discrete bodies 44 are greater than those of the matrix resin to be impregnated into the reinforcement structure 10. It is additionally preferred that the discrete bodies 44 not comprise microspheres including a blowing agent.

The core layer 40, which comprises the discrete bodies 44 impregnated into the non-woven layer 46, is preferably substantially completely devoid of a resin binder material. The core layer 40 comprises of from about 5% to about 50% by weight, based on the total weight of the reinforcement structure 10. The discrete bodies 44 comprise of from about 5% to about 80% by volume of the total volume of the core layer 40.

The discrete bodies 44 function as a lightweight filler material in the core layer 40, which as shown in FIG. 1 is comprised of the elongated fibers mechanically coupled by entangling. Hence, composite parts having the reinforcement structure 10 of the present invention incorporated therein are of a lighter weight than those having the prior art reinforcement structure, discussed above, incorporated therein. Preferably, the discrete bodies 44 also function to enhance the mechanical properties of composite parts having the reinforcement structure 10 of the present invention incorporated therein. More specifically, preferred discrete bodies 44, such as those formed substantially from only polyvinyl chloride foam as well as those formed from expanded polystyrene/hollow glass spheres, polyvinyl chloride foam/hollow glass spheres, polyvinyl chloride-urea foam/hollow glass spheres, or polyurethane foam/hollow glass spheres will, it is believed, enhance the shear strength of a resultant composite part during bending or flexure and, will also result in the composite part having improved compressive strength, an enhanced elastic modulus and an enhanced shear modulus when compared to a similar composite part having the prior art reinforcement structure incorporated therein. More specifically, it is believed that the discrete bodies 44 including the glass spheres will provide the greatest enhancement in mechanical properties to a final composite part. It is further believed that polyvinyl chloride foam or PVC-Urea foam discrete bodies will provide improved mechanical properties to a final composite part over that of expanded polystyrene foam discrete bodies. However, the expanded polystyrene foam discrete bodies will, it is believed, enhance the mold filling capabilities of the reinforcement structure 10. It is also noted that it is not desirable to use discrete bodies 44 formed from expanded polystyrene foam with a polyester matrix resin as a component within the matrix resin will attack and degrade the polystyrene foam discrete bodies 44.

Figure 2:
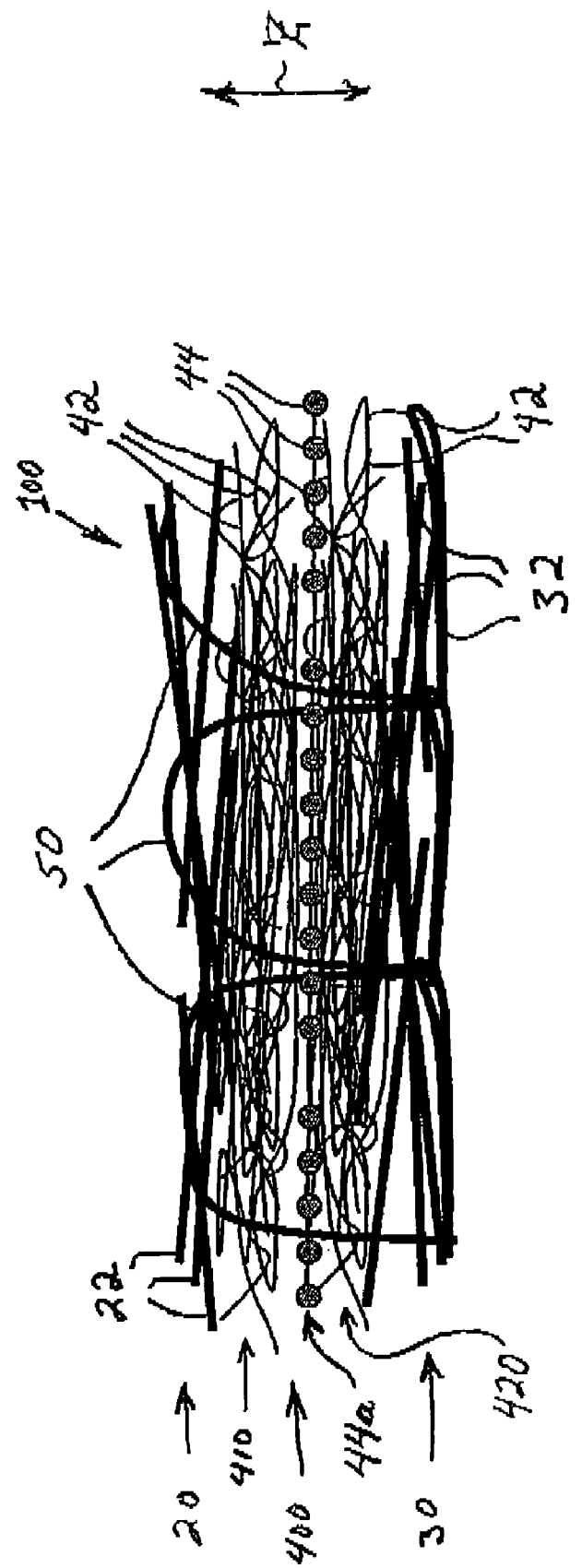
FIG. 2 is a side view of a reinforcement structure constructed in accordance with a second embodiment of the present invention.

In a second embodiment illustrated in FIG. 2, where like elements are referenced by like reference numerals, the reinforcement structure 100 comprises first and second reinforcement layers 20 and 30 and a flexible core layer 400 comprising elongated fibers 42 and a plurality of discrete bodies 44. The core layer 400 is positioned between the first and second reinforcement layers 20 and 30. The first, second and core layers 20, 30 and 400 are coupled together via stitching 50, i.e., thread.

The core layer 400 comprises a first substantially planar, flexible, porous non-woven layer 410 of the elongated fibers 42 and a second substantially planar, flexible, porous non-woven layer 420 of the elongated fibers 42. For example, the non-woven layers 410 and 420 may comprise conventional needle felt layers formed from any one of the elongated fibers 42 described above. Each non-woven layer 410 and 420 may be formed from a plurality of layers of web 42a using the cross-lapper/dispensing apparatus 300, see FIG. 3. The discrete bodies 44 are preferably provided at the interface between the two layers 410 and 420. In FIG. 2, substantially all of the discrete bodies 44 are located between the first and second layers 410 and 420 so as to define a separate layer 44a of discrete bodies 44 between the two layers 410 and 420. It is also contemplated that a portion of the discrete bodies 44 may be impregnated into one or both of the layers 410 and 420 while the remaining discrete bodies 44 are positioned between the layers 410 and 420 so as to define a separate layer 44a. It is further contemplated that substantially all of the discrete bodies 44 may be substantially impregnated into opposed sections of the layers 410 and 420, in equal or unequal amounts.

The discrete bodies 44 used in the core layer 400 may comprise any one of the discrete bodies discussed above with regards to the FIG. 1 embodiment.

Prior to being combined with the first and second reinforcement layers 20 and 30, the layer 410 has a thickness in the Z direction, see FIG. 2, of from about 1 mm to about 6 mm, while layer 420 has a thickness in the Z direction, see FIG. 2, of from about 1 mm to about 6 mm. The core layer 400 comprises from about 5% to about 50% by weight of the reinforcement structure 100, based on the total weight of the reinforcement structure 100. The discrete bodies 44 comprise of from about 5% to about 80% by volume of the total volume of the core layer 400.

In the FIG. 2 embodiment, the first reinforcement layer 20 preferably comprises, prior to matrix resin impregnation, of from about 25% to about 47.5% by weight, based on the total weight of the reinforcement structure 100 The second reinforcement layer 30 preferably comprises, prior to matrix resin impregnation, of from about 25% to about 47.5% by weight, based on the total weight of the reinforcement structure 100.

What is claimed is:

1. A reinforcement structure adapted for use in forming a composite part, said structure comprising:
    a first reinforcement layer;
    a second reinforcement layer; and
    a flexible core layer comprising a first substantially planar, non-woven layer of elongated fibers, a second substantially planar, non-woven layer of discrete elongated fibers randomly oriented and mechanically bonded together, an interface between said first and said second non-woven layers and a plurality of discrete foamed plastic bodies.

2. A reinforcement structure as set forth in claim 1, wherein said discrete fibers are comprised of fibers selected from the group consisting of ceramic fibers, glass fibers, carbon fibers, graphite fibers, polymer fibers, and combinations thereof.

3. A reinforcement structure as set forth in claim 1, wherein said core layer is positioned between said first and second reinforcement layers.

4. A reinforcement structure as set forth in claim 3, further comprising structure for coupling said first, second and core layers together.

5. A reinforcement structure as set forth in claim 4, wherein said coupling structure comprises stitching passing through each of said first, second and core layers.

6. A reinforcement structure as set forth in claim 1, wherein said first and second non-woven layers are comprised of fibers selected from the group consisting of polyester fibers, polyethylene terephthalate (PET) fibers, polypropylene fibers, polyethylene fibers, polyamide fibers, polyacrylonitrile fibers, glass fibers, and combinations thereof.

7. A reinforcement structure as set forth in claim 1, wherein said discrete foamed plastic bodies are formed from hollow glass spheres and one of an expanded polystyrene, a foamed polyvinyl chloride, polyvinyl chloride-urea foam and polyurethane foam.

8. A reinforcement structure as set forth in claim 1, wherein said discrete foamed plastic bodies have a density which is less than that of a matrix resin to be impregnated into said reinforcement structure.

9. A reinforcement structure as set forth in claim 1, wherein said discrete foamed plastic bodies are free of microspheres including a blowing agent.

10. A reinforcement structure adapted for use in forming a composite part, said structure comprising:
    a first reinforcement layer;
    a second reinforcement layer; and
    a flexible core layer comprising a first substantially planar, non-woven layer of elongated fibers, a second substantially planar, non-woven layer of discrete, elongated fibers randomly oriented and mechanically bonded together and a layer of discrete foamed plastic bodies provided between said first and said second non-woven layers.

11. A reinforcement structure as set forth in claim 10, wherein said discrete fibers are comprised of fibers selected from the group consisting of ceramic fibers, glass fibers, carbon fibers, graphite fibers, polymer fibers, and combinations thereof.

12. A reinforcement structure as set forth in claim 1, wherein said core layer is positioned between said first and second reinforcement layers.

13. A reinforcement structure as set forth in claim 12, further comprising structure for coupling said first, second and core layers together.

14. A reinforcement structure as set forth in claim 13, wherein said coupling structure comprises stitching passing through each of said first, second and core layers.

15. A reinforcement structure as set forth in claim 10, wherein said elongated fibers defining said first and second non-woven layers are mechanically coupled together.

16. A reinforcement structure as set forth in claim 15, wherein said first and second non-woven layers are comprised of fibers selected from the group consisting of polyester fibers, polyethylene terephthalate (PET) fibers, polypropylene fibers, polyethylene fibers, polyamide fibers, polyacrylonitrile fibers, glass fibers, and combinations thereof.

17. A reinforcement structure as set forth in claim 10, wherein said discrete foamed plastic bodies also include hollow glass spheres.

18. A reinforcement structure as set forth in claim 10, wherein said discrete foamed plastic bodies have a density which is less than that of a matrix resin to be impregnated into said reinforcement structure.

19. A reinforcement structure as set forth in claim 10, wherein said discrete foamed plastic bodies are free of microspheres including a blowing agent.

20. A reinforcement structure as set forth in claim 10, wherein said core layer is substantially devoid of a resin binder material.

21. A reinforcement structure as set forth in claim 10, wherein the elongated fibers have a length of from about 10 millimeters to about 120 millimeters and are mechanically coupled by entangling.

22. A reinforcement structure as set forth in claim 1, wherein said plurality of discrete foamed plastic bodies are provided along said interface.

23. A reinforcement structure as set forth in claim 22, wherein said plurality of discrete foamed plastic bodies are provided in only one of said first non-woven layer and said second non-woven layer.

24. A reinforcement structure as set forth in claim 22, wherein said plurality of discrete foamed plastic bodies are provided in both of said first and second non-woven layers.

* * * * *